United States Patent [19]
George

[11] 3,878,636
[45] Apr. 22, 1975

[54] STILL FISHING LURE
[75] Inventor: Ernest R. George, Essex, Ontario, Canada
[73] Assignee: The Raymond Lee Organization, Inc., New York, N.Y. ; a part interest
[22] Filed: Feb. 28, 1974
[21] Appl. No.: 447,243

[52] U.S. Cl. .............. 43/42.74; 43/43.11; 43/43.12
[51] Int. Cl............................................. A01k 93/00
[58] Field of Search............. 43/42.74, 43.15, 43.11, 43/43.12, 41.2

[56] References Cited
UNITED STATES PATENTS
| | | | |
|---|---|---|---|
| 2,289,663 | 7/1942 | Linhares | 43/42.74 |
| 3,124,892 | 3/1964 | O'Brien | 43/43.15 |
| 3,577,669 | 5/1971 | Johnson | 43/43.11 |

FOREIGN PATENTS OR APPLICATIONS
87,247  6/1896  Germany .......................... 43/42.74

Primary Examiner—Warner H. Camp
Attorney, Agent, or Firm—Daniel Jay Tick

[57] ABSTRACT

A still fishing lure includes a conical float removably affixed to a fishing line at its apex and has a weight supporting pin extending therefrom. A substantially rod-like substantially horizontal spreader arm is affixed to the base of the float and has spaced free ends. Each of a pair of fish hooks is affixed to a corresponding free end of the spreader arm. A sinker line is attached to a looped element on a weight at the free end thereof and is affixed at the other end to the base of the float. The looped element on the weight being releasably secured to the float pin during a cast.

1 Claim, 3 Drawing Figures

PATENTED APR 22 1975  3,878,636
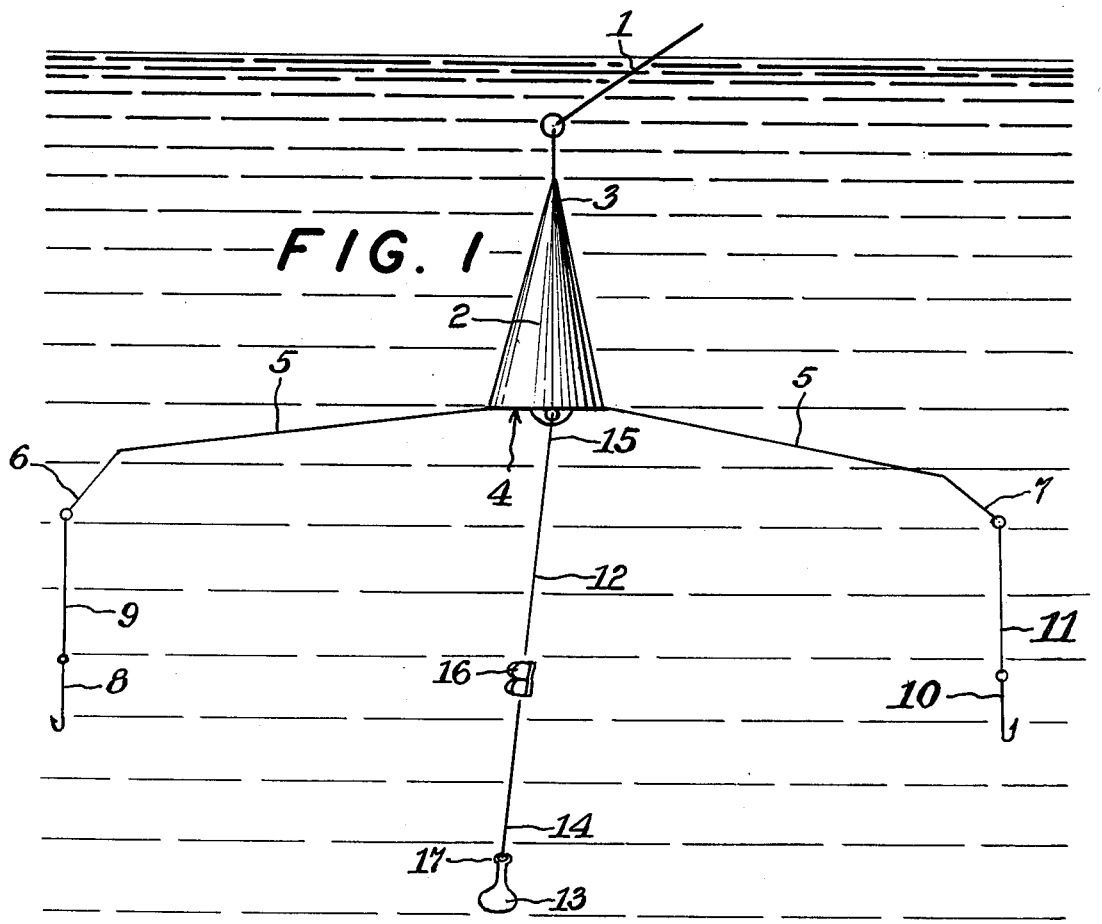
FIG. 1
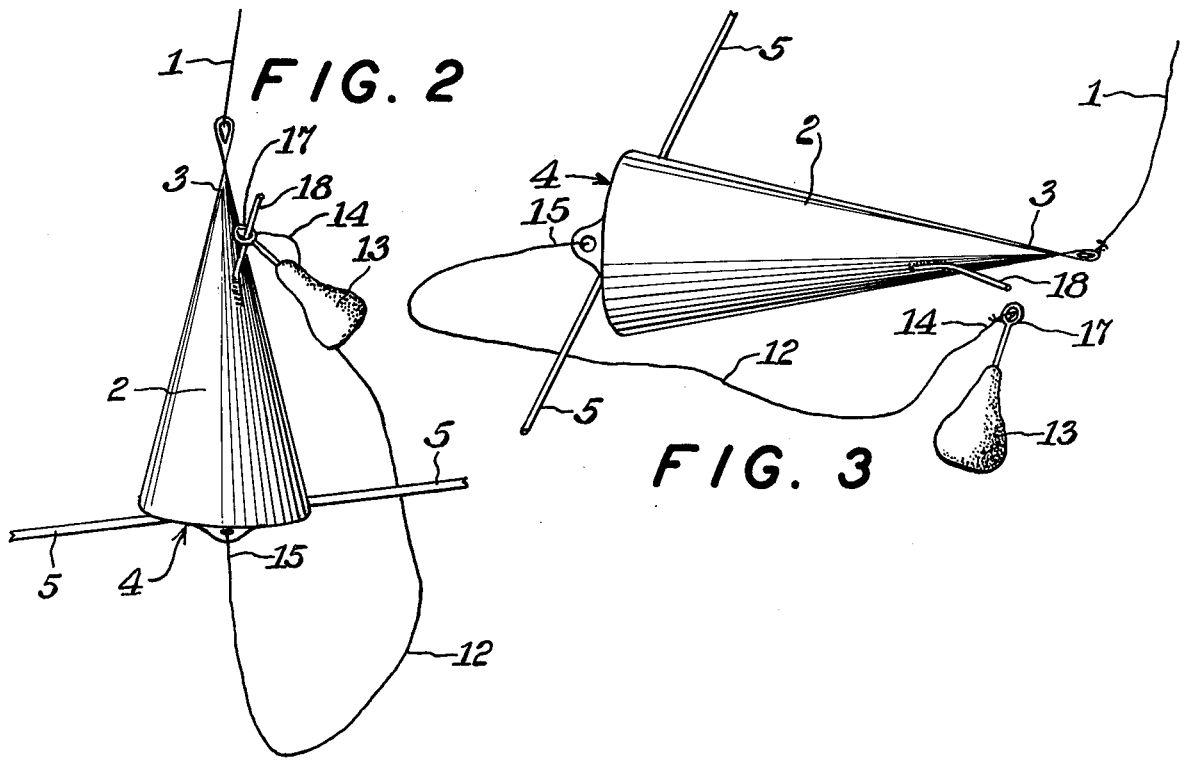
FIG. 2
FIG. 3

STILL FISHING LURE

DESCRIPTION OF THE INVENTION

The present invention relates to a still fishing lure. More particularly, the invention relates to a still fishing lure adapted to be tied to a fishing line.

Objects of the invention are to provide a still fishing lure of simple structure, which is inexpensive in manufacture, convenient and easy to use, has a sinker line which may be adjusted to permit fishing as close to and as far from the bottom as desired, does not snag, does not permit the hooks to lie on the bottom, is very sensitive under water and is effective, efficient and reliable in operation.

In order that the invention may be readily carried into effect, it will now be described with reference to the accompanying drawing, therein:

FIG. 1 is a schematic diagram of an embodiment of the adjustable still fishing lure of the invention in use;

FIG. 2 is a schematic diagram, on an enlarged scale, of the float and sinker of the adjustable still fishing lure of the embodiment of FIG. 1; and FIG. 3 is a schematic diagram, on an enlarged scale, of the float and sinker of the adjustable still fishing lure of the embodiment of FIG. 1.

In the FIGS., the same components are identified by the same reference numerals.

The adjustable fishing lure of the invention is adapted to be tied to a fishing line 1 (FIGS. 1 to 3). The fishing lure comprises a float 2 (FIGS. 1 to 3) removably affixed to the fishing line 1. The float 2 is substantially conical, having an apex 3 and a base 4, and is removably affixed to the fishing line 1 at its apex.

A substantially rod-like substantially horizontal spreader arm 5 (FIGS. 1 to 3) is affixed to the base 4 of the float 2 and has spaced free ends 6 and 7 (FIG. 1).

A fish hook 8 is affixed to the free end 6 of the spreader line 5 via a short length of fishing line 9. A fishing hook 10 is affixed to the free end 7 of the spreader arm 5 via a short length of fishing line 11.

An adjustable sinker line 12 has a weight 13 affixed to the free end 14 thereof and is affixed at its other end 15 to the base 4 of the float 2 (FIGS. 1 to 3). The sinker line 12 has an adjusting pin 16 (FIG. 1) affixed therein for adjusting the length of the sinker line beneath the float 2 thereby adjusting, to a desired extent, the position of the hooks 8 and 10 above the bottom. The float 2 floats under water, as shown in FIG. 1, due to the pull of the weight 13 on the sinker line 12.

The weight 13 has a loop 17 on it (FIGS. 1 to 3). The float 2 has a pin 18 (FIGS. 2 and 3) extending therefrom for releasably supporting the weight 13 by extending through the loop 17 on the weight.

While the invention has been described by means of a specific example and in a specific embodiment, I do not wish to be limited thereto, for obvious modifications will occur to those skilled in the art without departing from the spirit and scope of the invention.

I claim:

1. A still fishing lure adapted to be tied to a fishing line, said fishing lure comprising a float body removably affixed to a fishing line, the float being substantially conical having an apex and a base and being removably affixed to the fishing line at its apex and having a pin extending therefrom adjacent said apex for supporting a weight;

a substantially rod-like substantially horizontal spreader arm affixed to the base of the float and having spaced free ends;

a pair of fish hooks each affixed to a corresponding free end of the spreader arm; and a sinker line having a weight at the free end thereof and affixed at the other end to the base of the float, the weight having a securing element for the sinker line provided with a loop whereby it is supported by the pin extending from the float when the float is thrown into a body of water, the float floating under water due to the pull of the weight on the sinker line and the weight slipping off the pin when the float is in the water.

* * * * *